United States Patent [19]

Miller et al.

[11] Patent Number: 5,020,014

[45] Date of Patent: May 28, 1991

[54] GENERIC INTERPOLATION PIPELINE PROCESSOR

[75] Inventors: Michael S. Miller, Champlin; Hendrik A. E. Spaanenburg, Minneapolis, both of Minn.

[73] Assignee: Honeywell Inc., Minneapolis, Minn.

[21] Appl. No.: 307,354

[22] Filed: Feb. 7, 1989

[51] Int. Cl.$^5$ .............................................. G06F 7/38
[52] U.S. Cl. ................................................ 364/723
[58] Field of Search ............................ 364/723, 736

[56] References Cited

U.S. PATENT DOCUMENTS 4,313,173 1/1982 Candy et al. ..................... 364/723
4,802,109 1/1989 Machida ............................ 364/723

*Primary Examiner*—Dale M. Shaw
*Assistant Examiner*—Long T. Nguyen
*Attorney, Agent, or Firm*—Haugen and Nikolai

[57] ABSTRACT

A generic interpolation pipeline processor for use in a real-time video display system to find the coordinates of any point $P(x,y)$ on a line between $P_1(x_1,y_1)$ and $P_2(x_2,y_2)$ according to the equation $$y = y_1 + (y_2 - y_1) \cdot \frac{(x - x_1)}{(x_2 - x_1)}$$

The processor includes an apparatus for performing integer interpolation calculations using a single independent variable to calculate two dependent variables in parallel and further includes apparatus for merging division and multiplication operations so as to increase throughput as compared to a division pipeline followed by a multiply pipeline.

6 Claims, 11 Drawing Sheets

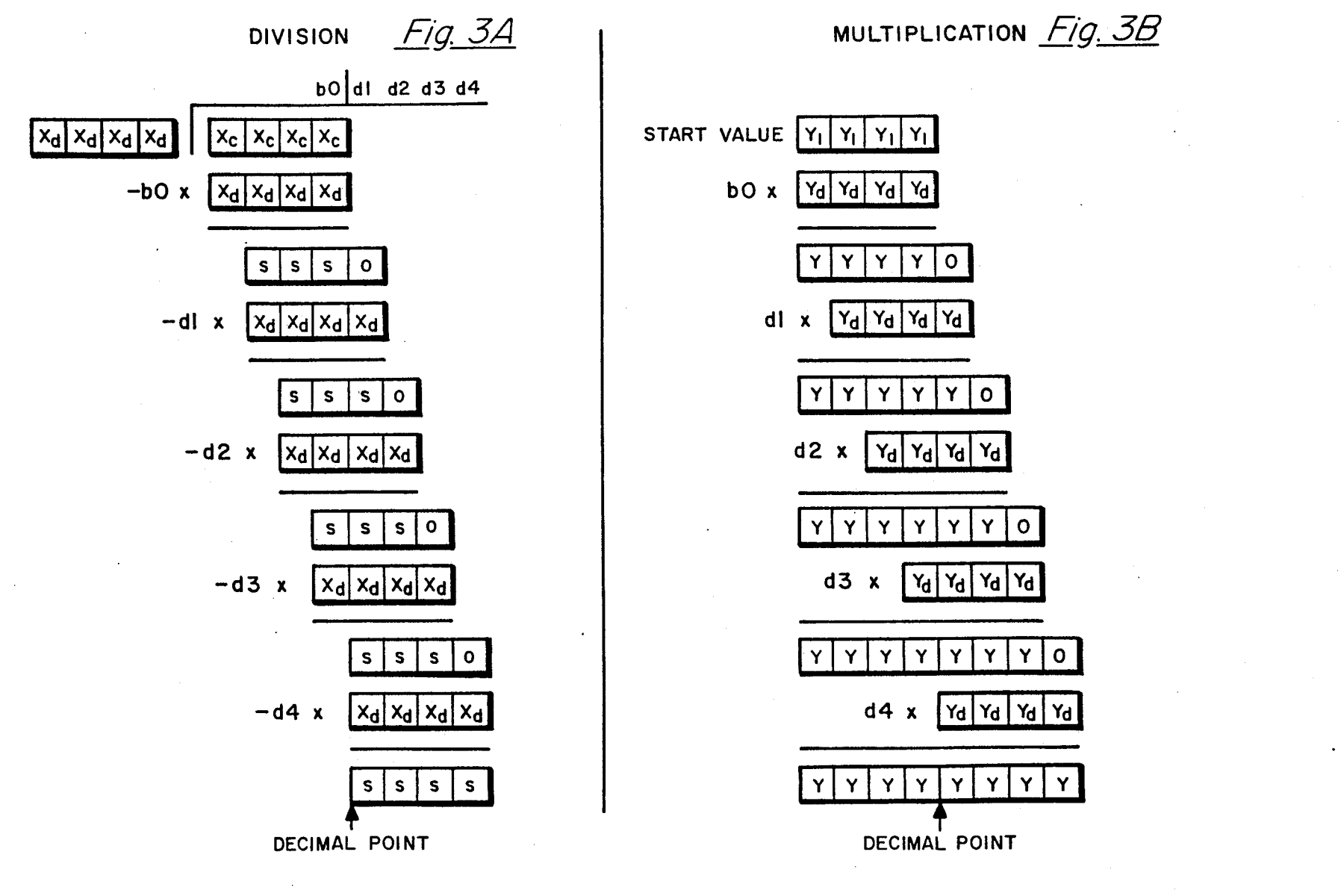

MULTIPLICATION *Fig. 3B*

DIVISION *Fig. 3A*

*n IS NUMBER OF BITS IN Y WORD.

GENERIC INTERPOLATION PIPELINE PROCESSOR

FIELD OF THE INVENTION

This invention relates to shading techniques applicable to color raster scan displays, and more particularly, to apparatus for providing Gouraud shading wherein color intensities are interpolated from intensities at the end points of lines and wherein this invention speeds up the operation of such interpolations.

BACKGROUND OF THE INVENTION

Any two points $P_1=(x_1, y_1)$ and $P_2=(x_2, y_2)$ in a cartesian space lie on a straight line. Interpolating to find the coordinates of any point $P=(x, y)$ on the line between these two points may be done using the equation of a line given by:

$$y = y_1 + (y_2 - y_1) \cdot \frac{(x - x_1)}{(x_2 - x_1)} \quad (1)$$

From Equation (1), it is obvious that an interpolation may be performed by three subtraction operations $[(x-x_1),(x_2-x_1),(y_2-y_1)]$ followed by a division, a subsequent multiplication and an eventual addition. Binary division and multiplication are generally performed by shift-and-add/subtract respectively shift-and-add operations. To increase throughput, the operation steps are usually pipelined, and the operations have latches between operation steps.

The invention accomplishes the merging of the division and multiply operations resulting in an increased performance compared to a division pipeline followed by a multiply pipeline. In a particular stage of the merged divide/multiply operator, the division part produces a quotient bit which is immediately used as the multiplicant bit in the multiply part.

In Gouraud shading, a technique applicable in color raster scan displays, the color intensity along the edge of a polygon is interpolated from the intensity at the endpoints. The intensity at the pixels within the polygon is interpolated from the intensity values at the ends of horizontal lines running from one edge to another. The invention speeds up the operation of the described bi-linear interpolator.

For example, consider the operation:

$$A \times (B/C)$$

A flow diagram of the conventional approach used to process this operation is shown in FIG. 1. In a conventional process, the division of B and C would be handled in a serial manner with each bit of the quotient, $d_o, d_1 \ldots d_n$, temporarily stored in block $D=B/C$. After the quotient has been stored in D, the operation of $A \times D$ is carried out, again in a step-by-step process where each bit "d" of the quotient D is multiplied by A to obtain the final result $A \times B/C$.

The procedure as illustrated in FIG. 1 above may be contrasted with the approach applying the principles of the invention by comparison with FIG. 2. FIG. 2 shows an illustrative flow diagram of the scheme of the invention doing the same multiplication and division. As is illustrated in FIG. 2, the division B/C is carried out in parallel with the multiplication $A \times (B/C)$. Each bit of the quotient, $d_o \cdots d_n$, is multiplied as it is produced at each stage of the division. No temporary storage of the quotient is required. Thus, the calculation of interpolation values is carried out in an extremely fast manner in contrast to the prior art.

SUMMARY OF THE INVENTION

The Generic Interpolation Pipeline Processor or "GIPP" of the invention is designed to accelerate the polygon draw and fill operations used in real-time video display systems. The chip performs integer interpolation calculations, such as those found in intensity interpolation shading, at high speed (effectively, for example, 225 million operations per second). A single independent variable is used to calculate two different dependent variables in parallel. Thus, a single GIPP can be used to draw correctly shaded monochrome lines at up to 25 million pixels per second. To ease control of the draw and fill process, the GIPP is equipped with an internal counter to allow the drawing of shaded lines by specifying only the values at the endpoints. The inputs are double buffered to allow efficient utilization of the chip's speed.

The GIPP uses hardware handshaking to read its input data, and supplies status bits indicating division by zero or invalid output data. Two GIPPs may be used to draw polygon edges and another one or more may be used to fill between the edges with a minimal amount of extraneous logic. When polygon edges are joined at their endpoints, a join signal may be used to avoid writing both new endpoints into the chip. A hold signal is available to halt all operations on the chip and a test mode may be used to perform in-circuit diagnostic tests.

The GIPP performs a pipelined linear interpolation calculation on all the raster points on a line extending from a point $P_1=(x_1,y_1)$ to a point $P_2=(x_2,y_2)$ The chip performs two interpolations in parallel, using a single independent variable and two dependent variables. In order to simplify the explanation of the principles of the invention, one dependent variable will be discussed here. The operation performed by the GIPP is given by $$y = y_1 + (y_2 - y_1) \cdot \frac{(x - x_1)}{(x_2 - x_1)}$$

where x is the raster coordinate at which the interpolation is to be performed. All input values are unsigned integers.

The vector $P_2-P_1$ is shifted to the origin, creating the quantities $RY=y_2-y_1$ and $RX=abs(x_2-x_1)$ An internal counter increments or decrements the independent variable on consecutive clock cycles, starting at $x_1$ and ending at $x_2$, to generate all points on a raster between the endpoints. The output of the counter is $CX=abs(x-x_1)$. The prologue also preshifts the outputs, both x and y, back to $P_1$. The independent variable x is not used in the calculations but is passed through the pipeline so that the chip outputs correct coordinate pairs.

To calculate the interpolated value, both a division and a multiplication are necessary. The GIPP provides high throughput by pipelining both the division and the multiplication. The actual quotient resulting from the division is not kept. Instead, each bit is used to perform a $1 \times n$ multiplication within the same pipeline stage as it is generated (n is the number of bits in the y axis word). Using such a scheme reduces communication stage to stage to the remainder, divisor, partial product, and multiplicand. This, in turn, results in an extremely dense and fast design.

Using a counter internal to the chip to generate x values between $x_1$ and $x_2$, as is done in the GIPP, allows several simplifying assumptions to be made. These assumptions greatly reduce the complexity of the implementation. Since the counter always counts from $x_1$ to $x_2$, $x-x_1$ and $x_2-x_1$ will always have the same sign. This means that the quotient will always be positive, and thus $y_2-y_1$ may always be added to $y_1$ regardless of its sign. Secondly, since $x-x_1$ will always be less than or equal to $x_2-x_1$, the largest possible quotient calculated is 1. This reduces the number of calculation stages required by almost one-half. Thirdly, since the operation being performed is an interpolation whose operands are strictly limited, no intermediate or final answer can be calculated which would overflow the capacity of the words used.

It is one object of the present invention to provide a pipelined linear interpolation calculation on all raster points on a line extending from a point $P_1=(x_1,y_1)$ to a point $P_2=(x_2,y_2)$ It is yet another object of the invention to provide a generic interpolation pipeline processor wherein the multiplication and division operations for calculating the linear interpolation equation are merged resulting in an increased performance compared to a division pipeline followed by a multiply pipeline.

It is yet another object of the invention to provide a particular stage of the merged divide and multiply operator wherein the division part produces a quotient bit which is immediately used as the multiplicant bit in the multiply portion of the calculation.

It is yet another object of the invention to provide a means for bilinear shading of polygons in color raster scan displays wherein the intensity at the pixels within the polygon is interpolated from the intensity values at the ends of horizontal lines running from one edge to another at high speeds.

It is yet another object of the invention to provide an internal counter which increments or decrements the independent variable x on consecutive clock cycles, starting at $x_1$ and ending at $x_2$, to generate all the points on a raster between the endpoints and wherein preshifting of x, $x_2$ and $y_2$ takes place before the divide/multiply calculation, while shifting of $y_1$ takes place at the end of the computation.

It is yet another object of the invention to provide two channels of computations present on a single processor chip which produce an 8-bit and a 16-bit computation of the interpolation equation from their respective $y_1$ and $y_2$ end values and wherein the two channels have the independent variable x as well as $x_1$ and $x_2$ in common.

Other objects, advantages and features of the invention will become apparent to those skilled in the art through the detailed description of the preferred embodiment, claims and drawings herein wherein like numerals refer to like elements.

BRIEF DESCRIPTION OF THE DRAWINGS

In the drawings, except for FIG. 9, the numbers 0-32 have been reserved to indicate bit separators and combiners as is customary in the art and to aid those skilled in the art in better understanding the preferred embodiment. All numbers in FIG. 9 represent the pin designation for the preferred embodiment.

FIGS. 3A and 3B jointly illustrate a flow diagram for the means provided by the invention for interpolation via merged division and multiplication.

DETAILED DESCRIPTION OF THE PREFERRED EMBODIMENT

FIG. 3A and 3B further illustrate the computer algorithm captured in the chip. The actual interpolation calculation takes place in the calculation stages. The example shown in FIGS. 3A and 3B uses five bit words for both independent and dependent variables. Each stage may be broken into two portions, one of which deals exclusively with the x values and calculates one bit of the division operation shown in FIGS. 3A, and other shown in FIG. 3B which deals with the y values and updates the multiplication. There is only one signal connecting the two portions of the stages.

Several operations are performed in the x portion of each stage. The quantity RX is subtracted from the quantity CX. If the sign of the result is negative, the quotient bit being calculated is zero, so the original CX value is passed to the following stage after being multiplied by two. After any stage, CX is the remainder of the division $(x-x_1)/(x_2-x_1)$ If the sign of the result is positive, the quotient bit must be one, and the new CX value is passed to the following stage, again after being scaled. Since CX is by definition less than or equal to RX, where RX in all stages equals $(x_2-x_1)$, the quotient of the two will always be less than or equal to one, so the words are identically aligned at the start of the interpolation.

In the y portion, similar operations are performed. The RY value is added to CY (where $CY=y_1$ and $RY=(y_2-y_1)$); the sign of the subtraction in the x portion of the stage is used to choose whether the old CY value or the new is to be passed to the following stage. If the subtraction resulted in a positive number, the quotient bit is a one, so the new value is passed after being extended on the low end with a zero. If the subtraction resulted in a negative number, the quotient bit is a zero and the old CY is passed, again after being extended. With each stage, the decimal point is moved to the left one bit position.

After the data passes through the proper number of stages, the remainder of the division is examined and the interpolated result is adjusted if necessary to provide an unbiased statistical error. Rounding is used to give an integer output. The rounding is performed by adding ½ LSB to the word and subsequently truncating.

Sample Flow

Figure 11:
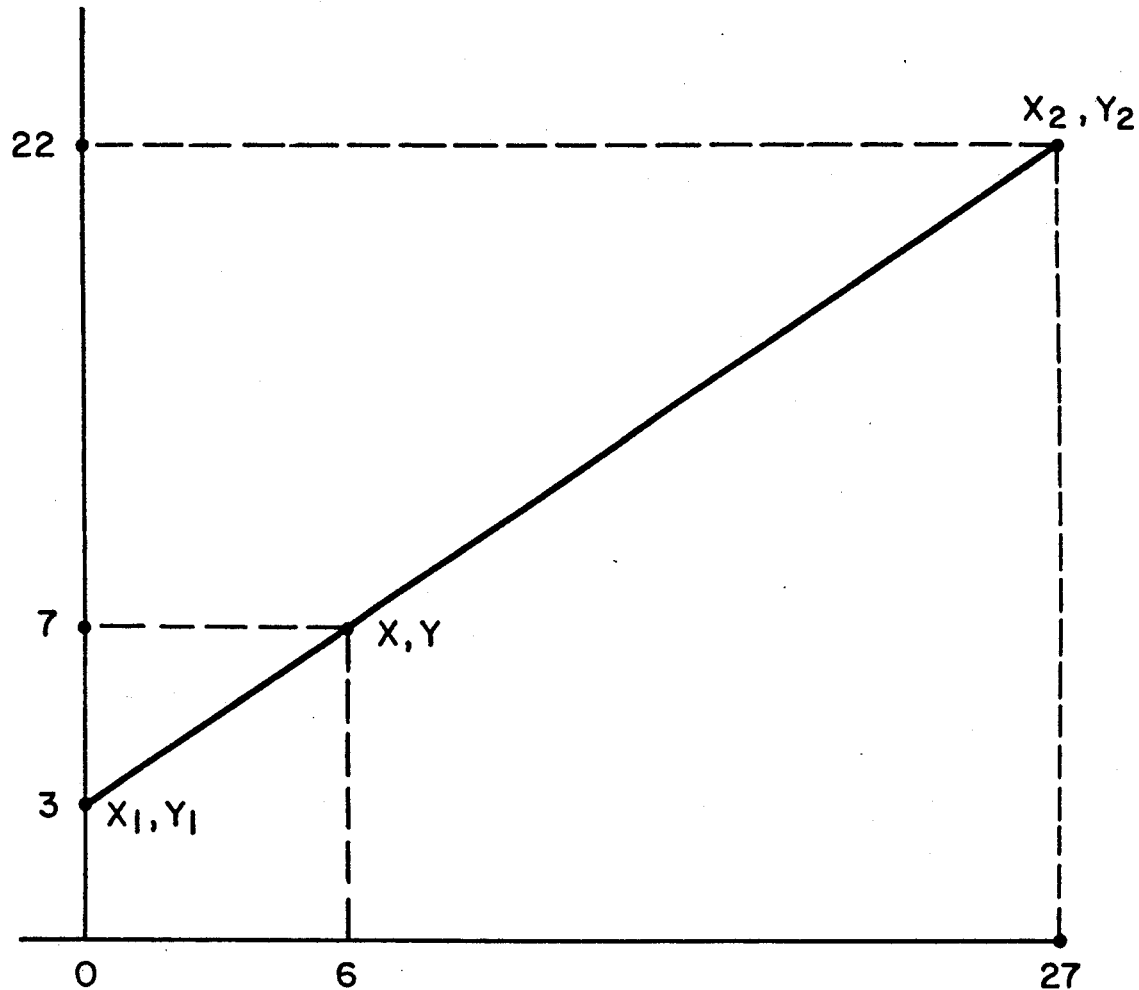
FIG. 11 illustrates an example of the interpolation scheme of the invention.

Table I shows the flow of the interpolation algorithm for one particular set of inputs. The sample problem is illustrated in FIG. 11. The right side of Table I shows the successive steps in the division, while the left side shows the multiplication and subsequent addition. The numbers for the X section are shown both in binary and in decimal notation for clarity. The decimal numbers corresponding to the binary CX values have been multiplied by 2 in each stage to emulate the one bit circular shift.

Calculation Error

After the $k^{th}$ calculation stage, the error in the quotient $(x-x_1)/(x_2-x_1)$ is in the interval $(-2^{1-k},0)$. The error interval may be made symmetrical by the addition of $2^{-k}$ to the quotient. Doing so moves the error to the interval $(-2^{-k}, 2^{-k})$, but causes exact results to take on a non-zero error value. To correct for this problem, the extra addition only takes place when the remainder after the $k^{th}$ stage is non-zero. The addition of the extra quantity, if necessary, is performed in conjunction with the rounding operation, as described below.

TABLE I
SAMPLE INTERPOLATION CALCULATION

| Prologue | Inputs : P1 = (0,3), p2 = (27,22), x = 6 <br> CY = y1 = 3     CX = x − x1 = 6 <br> RY = y2 − y1 = 19    RX = abs(x2 − x1) = 27 | | | |
|---|---|---|---|---|
| | MULTIPLICATION | | DIVISION | |
| Stage 0 | 00011. <br> 0x10011. | CY1 <br> RY | 6 <br> −27 | 000110. <br> 100101. | CX <br> RX |
| | 00011. | CYO | −21 | 101011. | |
| Stage 1 | 00011.0 <br> 0x1001.1 | CY1 <br> RY | 12 <br> −27 | 00110.0 <br> 10010.1 | CX <br> RX |
| | 00011.0 | CYO | −15 | 11000.1 | |
| Stage 2 | 00011.00 <br> 0x100.11 | CY1 <br> RY | 24 <br> −27 | 0110.00 <br> 1001.01 | CX <br> RX |
| | 00011.00 | CYO | −3 | 1111.01 | |
| Stage 3 | 00011.000 <br> 1x10.011 | CY1 <br> RY | 48 <br> −27 | 110.000 <br> 100.101 | CX <br> RX |
| | 00101.011 | CYO | 21 | 010.101 | |
| Stage 4 | 00101.0110 <br> 1x1.0011 | CY1 <br> RY | 42 <br> −27 | 10.1010 <br> 10.0101 | CX <br> RX |
| | 00110.1001 | CTO | 15 | 00.1111 | |
| Stage 5 | 00110.10010 <br> 1x.10011 | CY1 <br> RY | 30 <br> −27 | 0.11110 <br> 1.00101 | CX <br> RX |
| | 00111.00101 | CYO | 3 | 0.00011 | |
| Epilogue | 00111.00101 <br> .11001 | | | | |
| | 00111.11101 | | | | |
| Output | y = 00111 | | | | |

The maximum value of an n bit axis word is $2^n-1$. Multiplying this maximum value by the maximum absolute quotient error $2^{-k}$ gives a maximum error of $2^{n-k}-2^{-k}$ in the interpolated result. The error in the GIPP is required to be less than one-half of the LSB. Since the output values are integers, the maximum error must be less than $2^{-1}$. Comparing this specification with the expression for maximum error above yields a minimum stage count of n+1 stages. For the GIPP, with one sixteen bit word and one eight bit word, the stage count has been set to seventeen to meet the error criterion before rounding.

Even with the accuracy specified above, output errors may still occur. Cases may always be found where the correct result has a fractional portion greater than one-half, which rounds up, and the calculated value has a fractional portion less than one-half, which rounds down, or vice versa. However, such conditions should occur rarely. Simulations of the GIPP computer algorithm for all possible x input values show that exact answers occur more often than any others.

Recall, however, that the error depends not only on the quotient error but also on the magnitude of the multiplicand $RY=y_2-y_1$. For large RY, the error in the interpolated value will be large and the probability of rounding improperly much higher. It is reasonable to assume that the values of RY will be uniformly distributed from 0 to some $2^k$, where k is the maximum utilized word length. The full word width available will not necessarily be used in all applications. The density function of the product of the quotient and RY is simply a convolution of the respective density functions.

Finally, the probability of rounding to an incorrect value is dependent on the density function of the fractional portion of the correct answers to the problems being solved by the GIPP, which may be found in a manner similar to that used to determine the product error. It is dependent on both the input line length density function and the density function of RY.

Architecture

Figure 1:
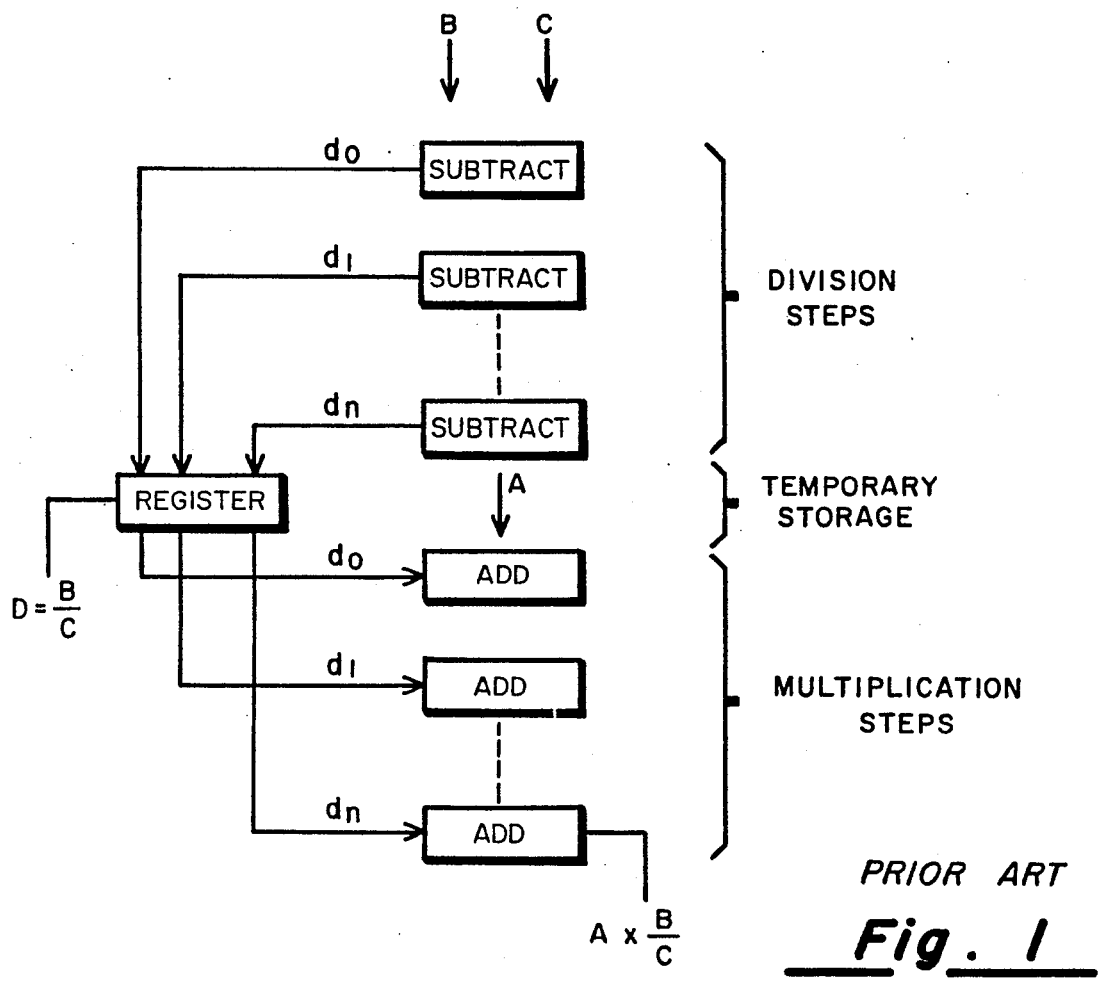
FIG. 1 is a flow diagram of a conventional approach for calculation of multiplication and division operations.
Figure 2:
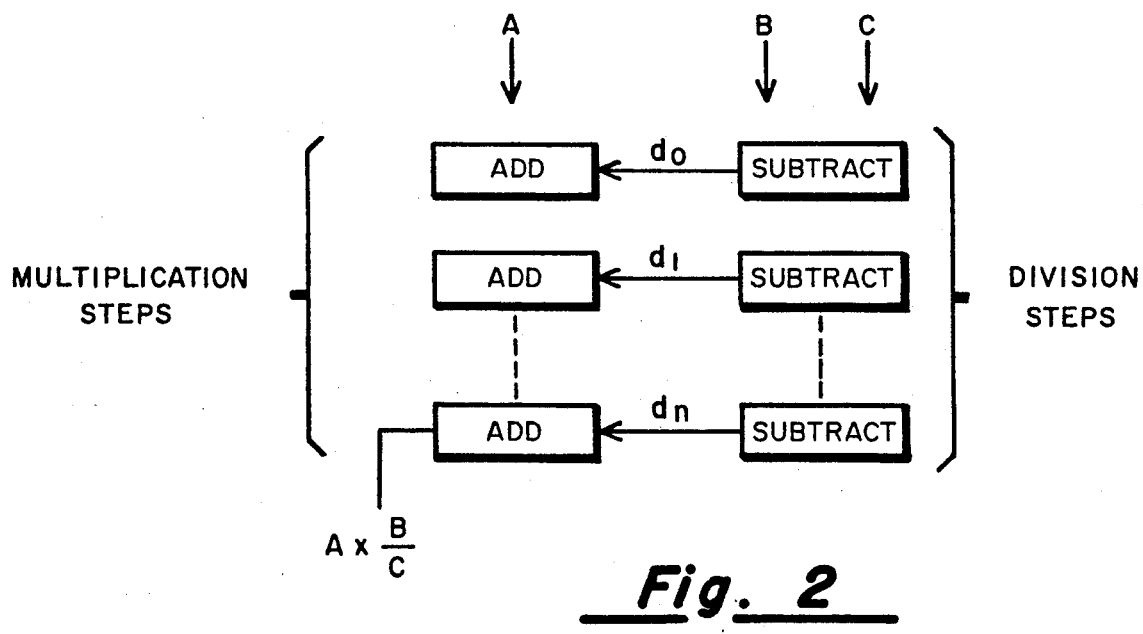
FIG. 2 is a flow diagram illustrating a calculation including a multiplication and division using the principles of the invention.
Figure 4:
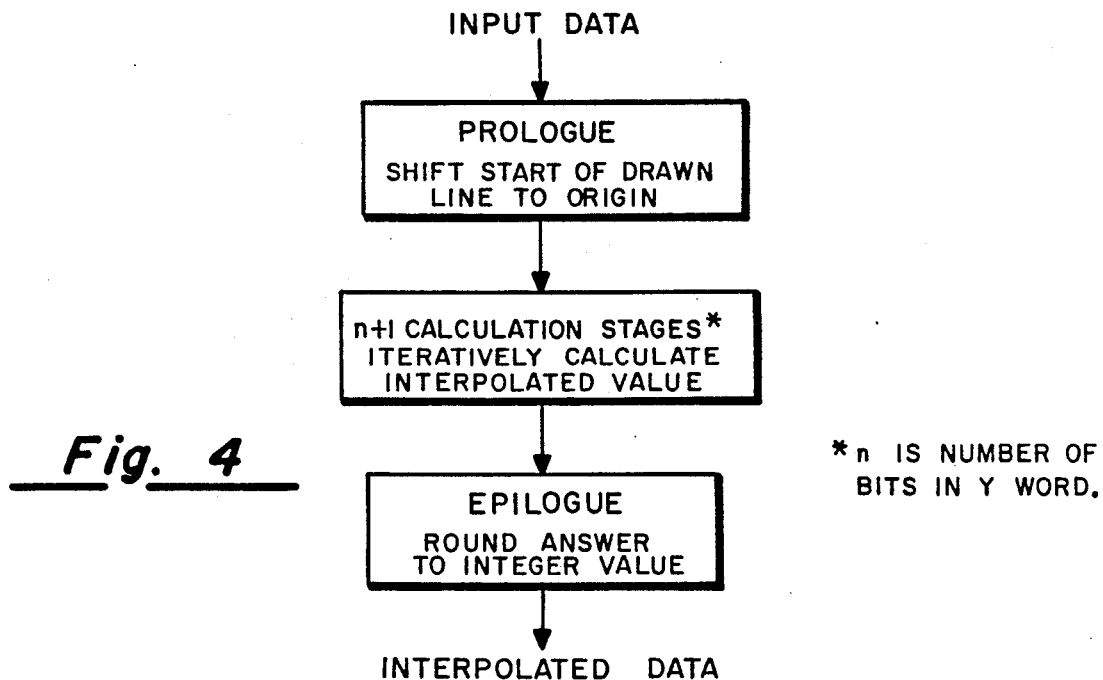
FIG. 4 schematically shows in block diagram form the overall architecture of the GIPP of the invention.

Having described the principles underlying this invention, this section now describes the architecture of the GIPP chip in detail. A block diagram of the overall chip architecture is shown in FIG. 4.

The inputs to the chip consist of a twelve bit coordinate value (the independent variable), a sixteen bit axis value (a dependent variable), and an eight bit axis value (a dependent variable). Each of these inputs is time multiplexed to read in values first for $P_1$ and then $P_2$, unless the chip is in join mode. The join mode and several control inputs are described below.

Figure 5A:
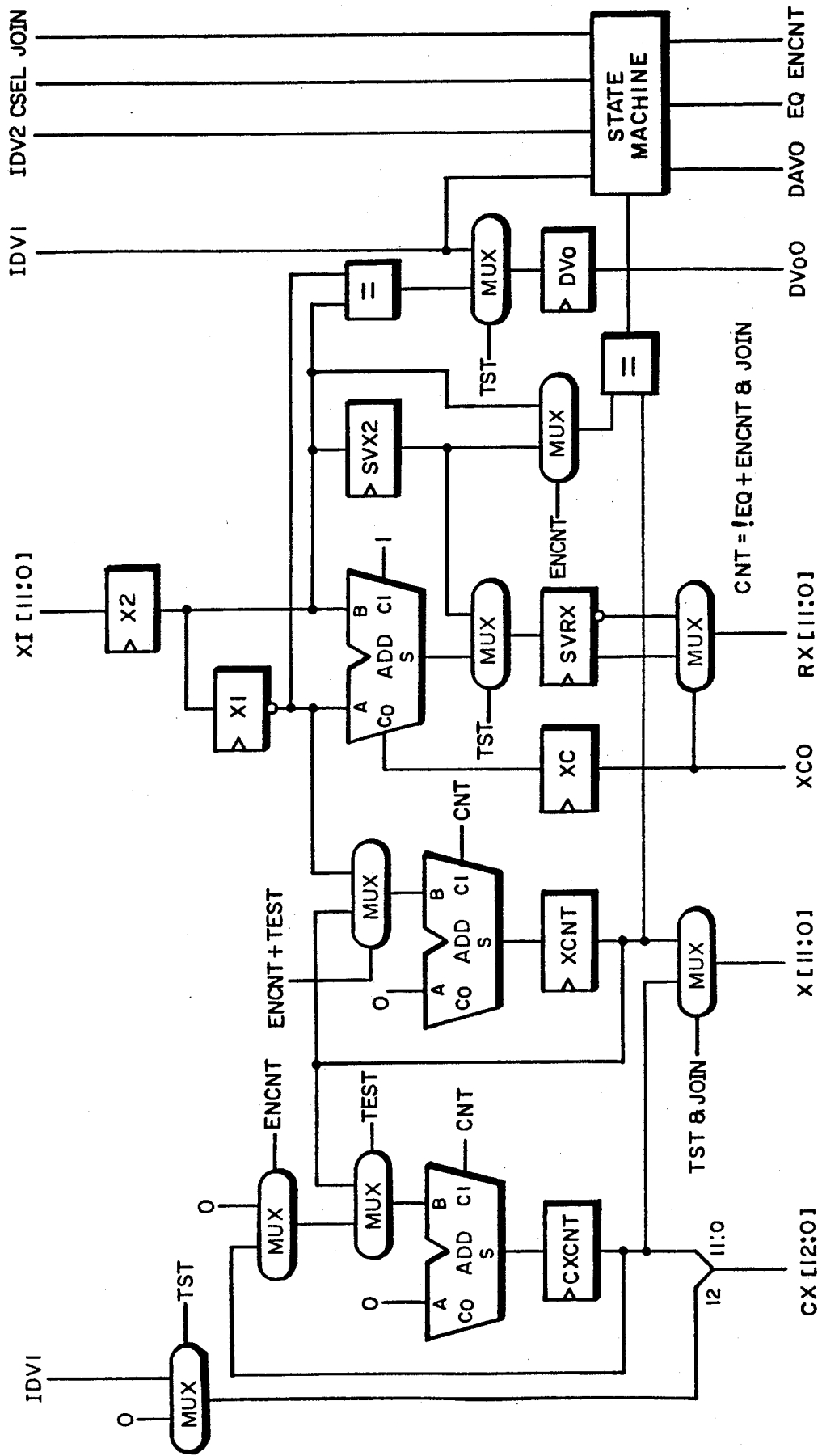
FIG. 5a schematically shows the prologue architecture of the invention for the x section in block diagram form.
Figure 5B:
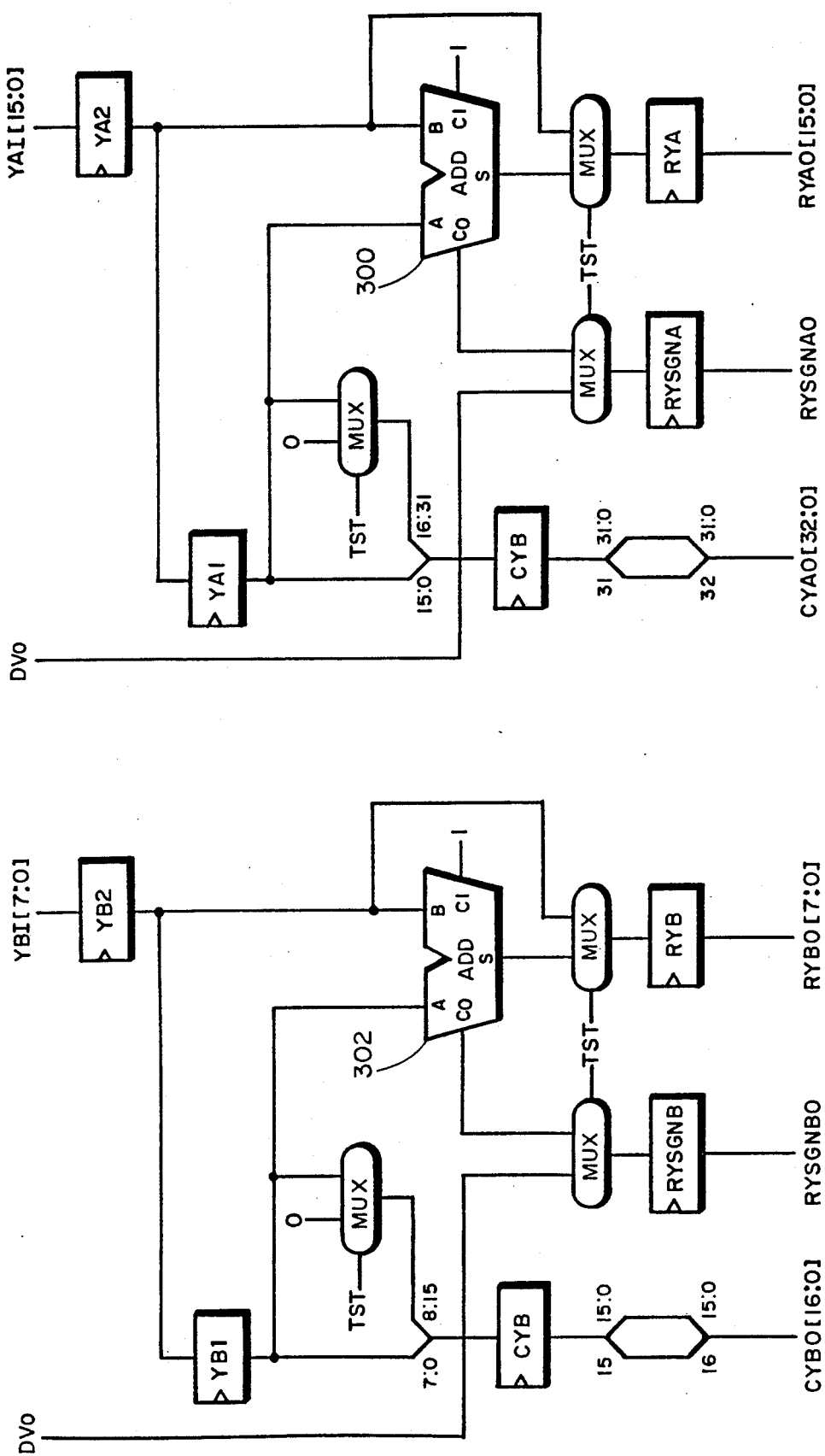
FIG. 5b schematically shows the prologue architecture of the invention for y sections in block diagram form.

The inputs are read into the input register section, which may be considered a part of the prologue section of the chip. The architecture of the prologue is shown in FIGS. 5a and 5b.

Figure 6:
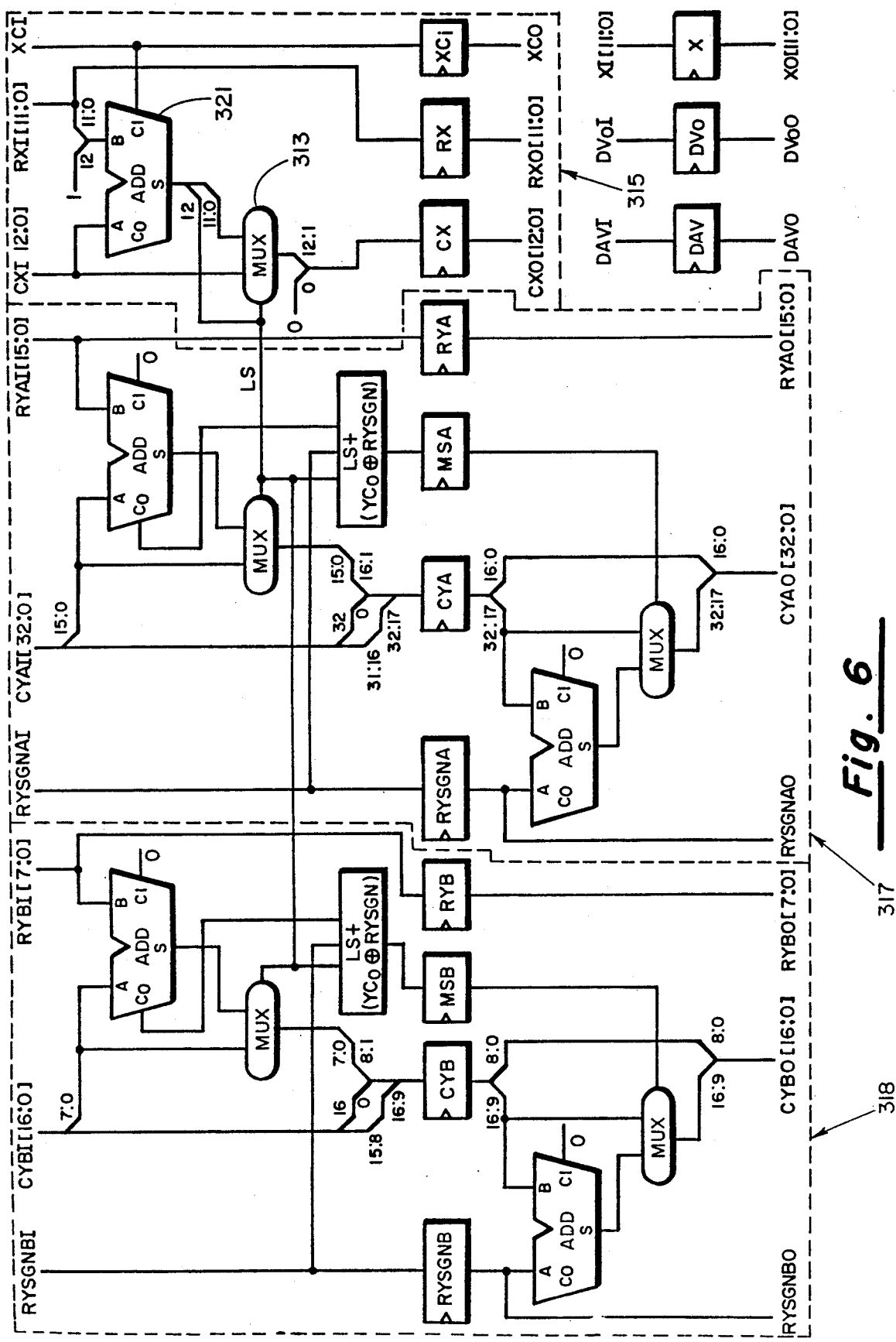
FIG. 6 schematically shows the calculation stage architecture of one embodiment of the invention in block diagram form.
Figure 7A:
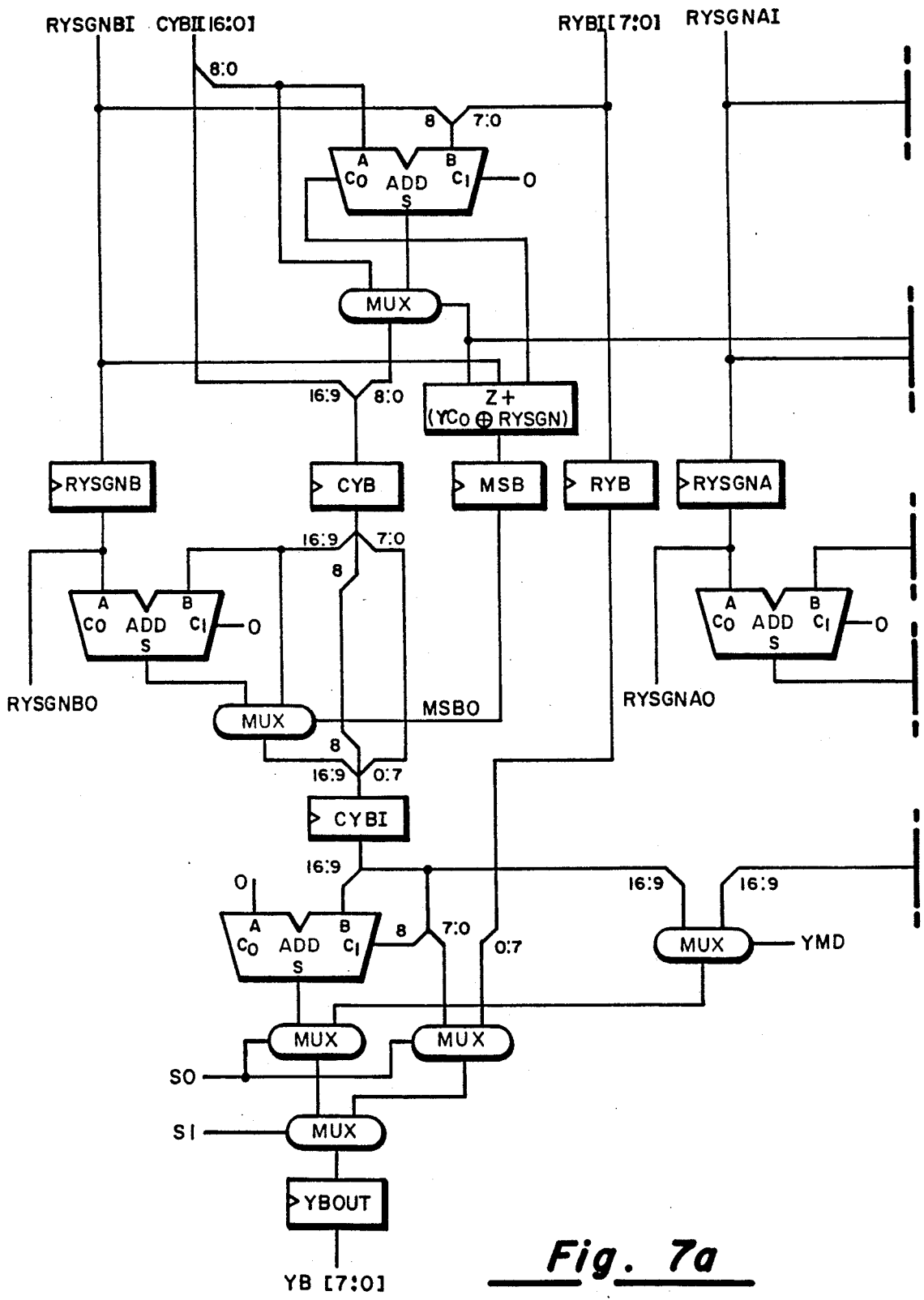
FIG. 7A and 7B schematically show the epilogue architecture for one embodiment of the invention in block diagram form.
Figure 7B:
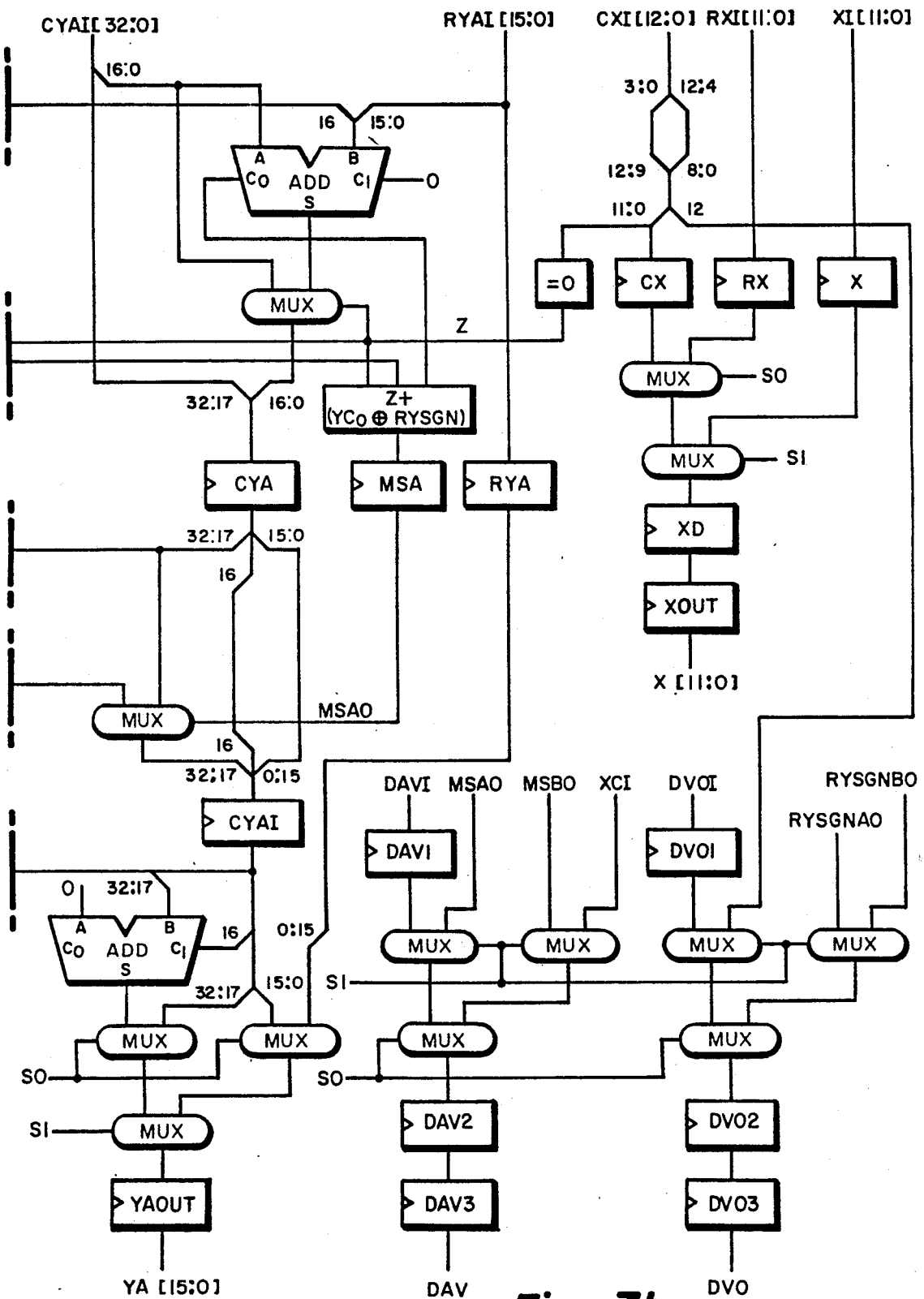

Between the prologue and the epilogue are seventeen calculation stages, whose architecture is shown in FIG. 6. Each stage consists of an X section 315 and two Y sections, YA 317 and YB. Note that throughout the Figures and this description, the letter "A" denotes the stages for the 16 bit axis value and the letter "B" denotes the stages for the 8 bit axis value. The respective X sections and Y sections are identical, stage to stage. The differences between the 8-bit section and the 16-bit section will be elucidated as appropriate in the discussion herein.

Figure 7:
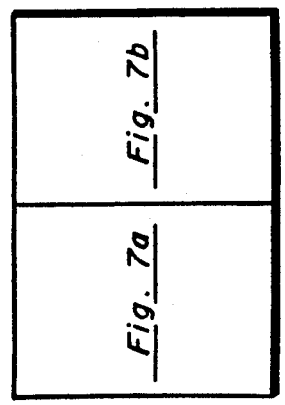

The epilogue architecture is shown in FIG. 7. The rounding operation which it performs is described below.

There are three data outputs from the chip, which correspond directly to the inputs. The X output value is the coordinate, and $Y_a$ and $Y_b$ the axis values corresponding to the coordinate on the X output pins. There are also two status flags associated with the data, whose operation is described hereinbelow.

Operation

The following sections describe the operation of the GIPP in each of its modes. The function of the input and control circuitry and the interpolation circuitry are discussed separately for each mode.

Normal Mode

The normal mode for the GIPP is to accept line endpoint data from some external source and draw shaded lines between the endpoints.

Input and Control Circuitry

Figure 8:
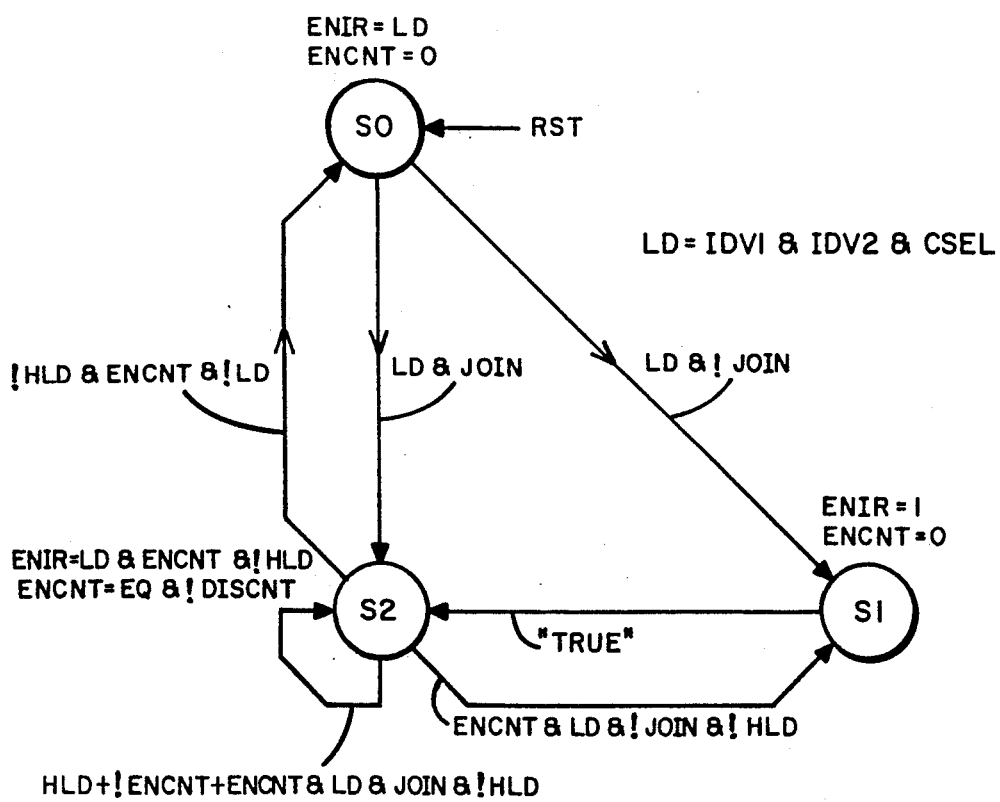
FIG. 8 schematically shows the GIPP control state-machine for one embodiment of the invention.

The operation of the input circuitry is controlled by the state machine shown in FIG. 8. The state machine has inputs both from the external world and from points internal to the chip. The external inputs are Input Data 1 Valid (IDV1), Input Data 2 Valid (IDV2), Chip Select (CSEL), Disable Count Load (DISCNT), Hold (HLD) and Join Endpoints (JOIN). The single internal input is Count Equals End of Count (EQ). The state machine outputs are Enable Input Registers (ENIR) and Enable Counter Load (ENCNT). The state machine variables are Input Register Full (IRF) and Two Point Load (TPL).

If CSEL is inactive, the GIPP is not selected, and the hold outputs EGH1 and EGH2 are placed in a high impedance state. No data can be loaded into the GIPP when CSEL is inactive.

In order to load data into the GIPP input registers, IDV1 and IDV2 must be active as well as CSEL. If JOIN is inactive and the input registers are empty, $P_1$ and $P_2$ are loaded on the two clock edges immediately following the assertion of the three signals. If JOIN is active and the input registers are empty, a single point ($P_2$) will be loaded on the first edge following the assertion of the three signals. The input registers are considered to be empty when either IRF is inactive or IRF is active but ENCNT is active and both DISCNT and HOLD are inactive.

When the input registers are full and the three signals are asserted, no data can be loaded, regardless of the status of JOIN. In this case, both EGH1 and EGH2 will be asserted after a one clock cycle delay. The input registers are considered to be full only when IRF is active and either ENCNT is inactive or DISCNT or HLD is active.

When both IDV1 and IDV2 are inactive and CSEL is active, the hold outputs EGH1 and EGH2 will become inactive after a one clock cycle delay, regardless of the state of the input registers.

When IDV1 and IDV2 are different and CSEL is active, one of the hold outputs will become active, again without regard to the state of the input registers. If IDV1 is inactive and IDV2 active, the EGH2 output will be asserted after a one clock cycle delay. If IDV2 is inactive and IDV1 active, the EGH1 output will be asserted after one clock cycle delay.

The input register full flag IRF is set on the clock edge which loads the first data point when JOIN is active, and on the edge which loads the second data point if JOIN is inactive. When IRF is true and the EQ flag becomes true, ENCNT will be set in order to load data into the interpolation circuitry. When ENCNT becomes active and HLD and DISCNT are both inactive, IRF will be set inactive if there is no valid data waiting at the inputs or if valid date is available and JOIN is inactive. If valid data is available and JOIN is active, IRF will remain active. Data transfer to the interpolation circuitry is enabled on the edge following the assertion of ENCNT if both DISCNT and HLD are inactive. If DISCNT is active, however, ENCNT is inhibited, thus disabling the transfer of data to the interpolation circuitry. When HLD is active, both the clock to the EQ register in the state machine and the clock to the counters is disabled, thus also preventing the transfer of data into the interpolation circuitry.

Interpolation Circuitry

When the internal counters CXCNT and XCNT finish and the input registers X2, X1, YA1, YA2, YB1 and YB2 are full, the input register data is transferred to the interpolation circuitry. Several operations are performed on the data before the interpolations are started.

Referring again to FIG. 5b, in the Y section, YA1 is subtracted from YA2 in a second adder 300. Similarly YB1 is subtracted from YB2 in ADDER $3_{02}$. The results are stored in the RY registers RYA and RYB respectively. The sign of the operation is also saved (as RYSGN) in RYSGNA and RYSGNB for use in the interpolation stages. The quantity $y_1$ itself is saved in a register called CYL (not shown) as the starting point of the successive approximation calculations. A register called CYM (not shown) is filled with zeroes, effectively sign extending $y_1$ to double its original word size.

Referring now to FIG. 5a, in the X section, $x_1$ is subtracted from $x_2$ in adder 304. The sign of the result is examined. If the sign is positive, the one's complement of the subtraction result is stored in the SVRX register. If the sign is negative, the result of the subtraction is stored in the SVRX register unchanged. The sign of the subtraction is also saved for later use.

The values given to the counters depend on the status of JOIN when the input data was loaded and the values of the data. In accordance with the equation CNT=!EQ+ENCNT & JOIN, if JOIN was active, the X counter will get $x_1 \pm 1$, depending on the sign of the $x_2 - x_1$ operation. The CX counter will be preset to one. If the input data has $x_1$ equal to $x_2$, however, the DVO flag is set and JOIN is overridden. If JOIN was inactive when the data was loaded or it was active and overridden by DVO, the X counter will get the value of $x_1$ and the CX counter will be preset to zero.

Immediately following the loading of the input data X1 and 0, the counters will commence their count. The X counter will count up if the sign of $(x_2 - x_1)$ is positive, and down otherwise. The CX counter will always count up from its starting point. On any cycle, the pending output of the counter is compared to the SVX2 register to determine if end of count will be reached on the following clock edge. If that condition is satisfied, the control state machine is notified so that it can prepare to transfer the next set of data, if any, from the input registers to the interpolation circuitry.

If the counters finish and there is no data in the input registers, X1, X2, etc., to be transferred to the interpolation circuitry, the DAV flag is set to indicate invalid data. This flag travels through the stages with the data and is output in parallel with it. When data is transferred to the counters, the DAV flag is set to indicate valid data, even if a divide by zero condition exists or the first point is a repeat of the previous point.

As the counters count, the data is sent on to the interpolation stages shown in FIG. 6 as x stage 315, YA stage 317 and YB stage 318. Each of the seventeen stages in the sixteen bit section is identical, but due to error requirements, the eight bit section is only nine stages long. The remaining stages of the eight bit section simply pass the data without performing any operation on it.

In the X section of a stage 315, the RX value is added to the CX value in adder 321, using the complement of the sign of RX as the carry input. Recall that if $x_2-x_1$ was negative, the subtraction result was saved with no changes. Thus the addition of RX to CX is equivalent to subtracting $x_2-x_1$ from $x-x_1$, which is represented by CX. This is the first step in the interpolation algorithm. If, however, $x_2-x_1$ was positive, the one's complement of the difference was saved. In this case, the addition with the carry input is also equivalent to subtracting $x_2-x_1$ from $x-x_1$.

The sign LS of the RX and CX addition is used to choose whether to keep the previous value of CX (CXI) or the new sum. This done in multiplexer 313. If the sign is positive, then the divisor is smaller than the dividend, so the sum is chosen. If the sign is negative, the old value is kept. Whichever is chosen, the CX input is left shifted one bit and zero filled. Thus, the multiply by two scaling required to send the data to the next stage is accomplished. The RX and X values in the stages are simply passed from each stage to the next with no change.

In the Y section, the sign LS (i.e., the 12th bit or MSB) of the sum of RX and CX is used in the same manner as it is in the X section. Thus, the sign value LS is used in the X, YA and YB sections. The RY value is added to the CY value and either the new sum or the old CY value is passed to the next stage, depending on the sign of the sum from the X section. Again, the value is left shifted by one bit and zero filled to prepare it for the next stage.

As the Y values are left shifted in the stages, the integer portion of the result gets transferred into CYM, and the fractional portion is stored in register CYL.

Rounding Circuitry

Now referring to FIGS. 4 and 7, once the data has passed through all the necessary interpolation stages, statistical bias is removed if necessary and rounding of the Y results is performed. The only operation performed in the X section is to detect a zero in the CX word, indicating a remainder of zero. If the remainder is zero, no bias removal will be performed. If bias removal is necessary, the data is passed through one more Y stage with the select bit hardwired to choose the new sum.

Once bias removal has been performed, the rounding operation may take place. To perform the rounding, the most significant bit of the fractional portion of the CY word is added to the least significant bit of the integer portion. If the YMD input is active, however, no rounding is performed on either the eight bit or sixteen bit results. Instead, the most significant eight bits of the fractional portion of the sixteen bit result are output on the eight bit output pins.

If the XMD pin is active the data valid flag DAV and the two least significant bits of X are available on the outputs one cycle before the corresponding YA and YB words. The ten most significant bits of the X output word are not affected by the state of XMD.

Hold Mode

When the HLD pin is asserted, the GIPP enters a hold state in which most on-chip operations are suspended. The chip remains in the hold state as long as the HLD pin remains asserted.

Input and Control Circuitry

During hold mode, the input and control circuitry functions exactly as in the normal mode, unless the TST pin is asserted. When TST is asserted, the input and control circuitry is held along with the rest of the chip. The only exceptions to this rule are the EGH1 and EGH2 registers, which are never held.

Interpolation Circuitry

While in hold mode, all clocks to internal registers are suspended as well as the counters and the EQ register in the state-machine. While in hold mode, the output enable pin OEN will remain operational.

Test Mode

When the TST pin is asserted, the GIPP enters a test state which allows the chip to be thoroughly tested in circuit. Such tests are well known by those skilled in the art and are usually run by introducing bit patterns and checking outputs for expected signature values. The chip remains in the test state until TST is disasserted.

Interface Description

One embodiment of the GIPP die has 104 pins. It has been designed to fit into both 100 pin and 104 pin packages.

Inputs

Figure 9:
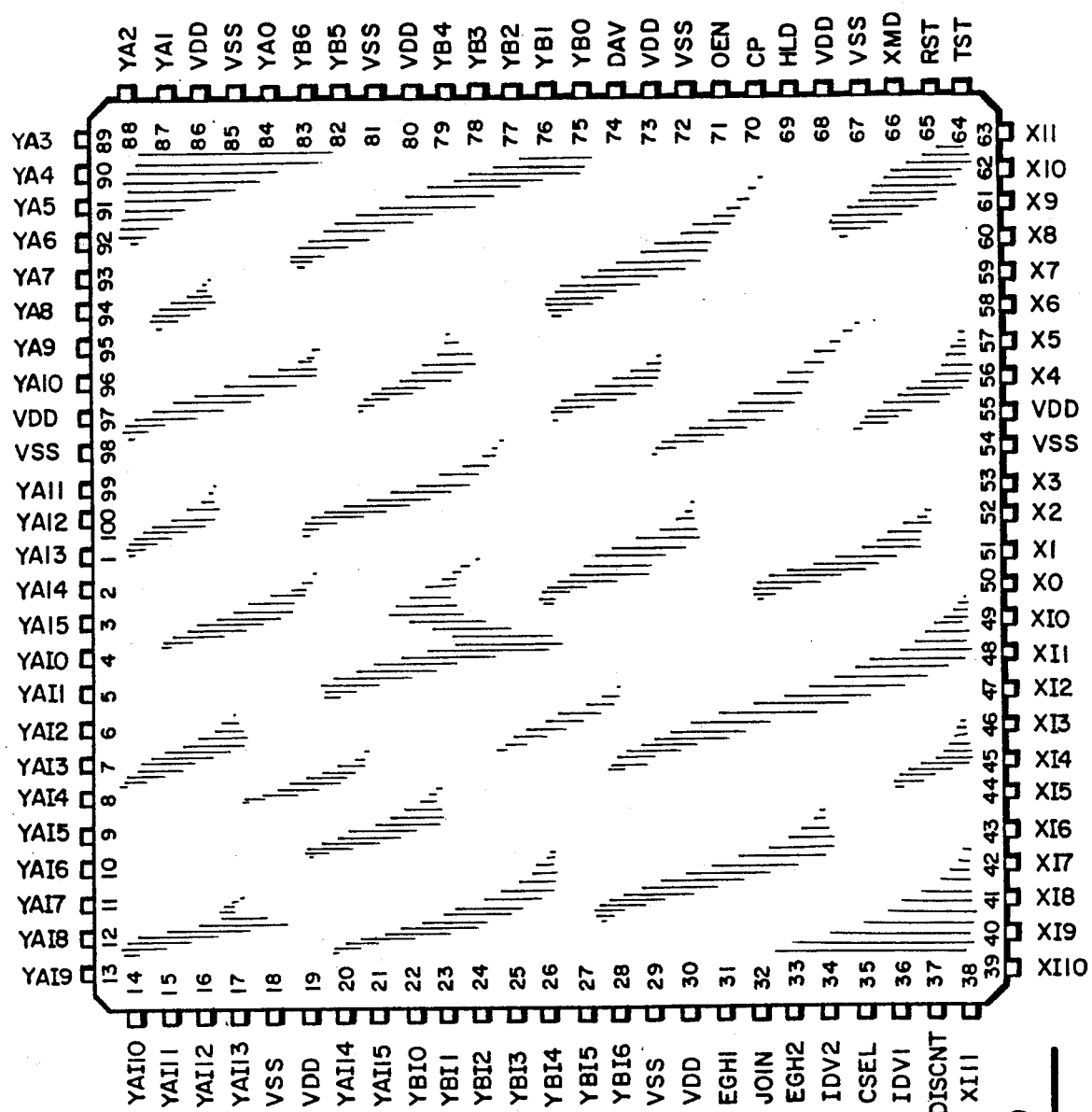
FIG. 9 shows a top view of one embodiment of the GIPP 100 pin package pinout of the invention.

Referring particularly to FIG. 9 and also to FIGS. 4, 5a, 5b, 6, 7 and 8, inputs to the GIPP are shown. The inputs are compatible with CMOS logic level input signals. Each input pin or bus is described separately.

$Y_a$ Input Bus YAI(15:0)

The $Y_a$ input bus is used to read the time multiplexed 16 bit unsigned integer initial and final coordinate axis values into the $Y_a$ input registers. The bus consists of 16 active high input pins. When IRF is false and IDV and CSEL are true, $y_{a1}$ is read into the first input register on the rising edge of CLK. On the following edge, $y_{a2}$ is read into the second input register. If JOIN is active, $y_{a2}$ is read in when IRF is active and IDV and CSEL are true; $y_{a1}$ is transferred from the second input register to the first.

$Y_b$ Input Bus YBI(7:0)

The $Y_b$ input bus is used to read the time multiplexed 8 bit unsigned integer initial and final coordinate axis values into the $Y_b$ input registers. The bus consists of 8 active high input pins. The most significant bit of this bus has a pulldown resistor on it to allow the insertion of the GIPP into a 100 pin package. When packaged in the 100 pin package, this pin is not bonded out. when IRF is false and IDV and CSEL are true, $y_{b1}$ is read into the first input register on the rising edge of CLK. On the following edge, $y_{b2}$ is read into the second input register. If JOIN is active, $y_{b2}$ is read in when IRF is active and IDV and CSEL are true; $y_{b2}$ is transferred from the second input register to the first.

X Input Bus XI(11:0)

The X input bus is used to read the time multiplexed 12 bit unsigned integer coordinate initial and final values into the X input registers. The bus consists of 12 active high input pins. When IRF is false and IDV and CSEL are true, $x_1$ is read into the first input register on the rising edge of CLK. On the following edge, $x_2$ is read into the second input register. If JOIN is active, $x_2$ is read in when IRF is active and IDV and CSEL are true; $x_1$ is transferred from the second input register to the first.

Hold Pin HLD

The hold pin is used to halt operation on the chip. The signal is active high. When HLD is true, data transfer through the interpolation circuitry is inhibited. During normal operation, if IRF is false when HLD is asserted, loading of data into the chip will still be enabled.

TST Pin TST

The TST pin is used to place the GIPP into a test state. The signal is active high. When TST is true, the prologue, epilogue, and interpolation stages are repartitioned into multiple independent serial shift paths. There are many well-known test patterns that could be incorporated into the chip.

Y Output Mode Pin YMD

The YMD pin is used the fractional portion of the $Y_a$ axis output value on the $Y_b$ axis value output pins. The signal is active high. When YMD is true, the fractional portion of the $Y_a$ axis is truncated and the most significant 8 bits output on the $Y_b$ axis output pins. The word is in a two's complement format. The $Y_a$ word is not rounded when YMD is active. The YMD input has a pulldown resistor to allow the insertion of the GIPP into a 100 pin package. When packaged in the 100 pin package, this pin is not bonded out.

X Output Mode Pin XMD

The XMD pin is used to obtain the two least significant bits of the X output word and the Data Valid flag DAV one clock cycle earlier than in normal operation.

Input Data Valid Pins IDV1 and IDV2

The IDV pins are used in conjunction with CSEL in the hardware handshaking protocol to read data into the GIPP. The pins are active high. When both IDV signals are asserted, it indicates that valid data to be loaded into the GIPP is present on the input pins. During normal operation, the data is read into the first set of input registers when IRF is inactive and CSEL is active. The second set of input registers is loaded on the clock cycle immediately following. The user is responsible for ensuring the presence of valid data during the second cycle of the load operation. When JOIN is active, however, the first set of input registers is loaded from the second set, and the second set from the external pins, so only one set of valid data is required.

Join Line Endpoints Pin JOIN

The JOIN pin allows the drawing of multiple connected line segments by using the endpoint of the current line as the starting point for the succeeding line. The pin is active high. When JOIN is active, the data for the first set of input registers is loaded from the second set, while the second set is loaded from the external input pins. When the data is loaded into the interpolation circuitry, the internal counter is loaded with a one rather than a zero, since the starting point of the new line was already drawn as part of the preceding line.

JOIN is loaded into its own input register in parallel with the first set of input data. This saved value is used to control the counter when the data is transferred to the interpolation circuitry. Care should be taken not to change the state of JOIN on the second cycle of a two cycle load. Doing so will cause the GIPP to skip the first point of the line when it is transferred into the interpolation circuitry.

Output Enable Pin OEN

The OEN pin controls the state of the three-state output buses X(11:0), YA(15:0), and YB(7:0). The pin is active low. When OEN is active, the pins drive the proper value off the chip. When OEN is inactive, all the output pins revert to a high impedance state.

Chip Select Pin CSEL

The CSEL pin is used in conjunction with IDV1 and IDV2 in the hardware handshaking protocol to read data into the GIPP. The pin is active low. When CSEL is asserted, it indicates that data may be loaded into the GIPP. During normal operation, the data is read into the first set of input registers when IRF is inactive and both IDV1 and IDV2 are active. The second set of input registers is loaded on the clock cycle immediately following. The user is responsible for ensuring the presence of valid data during the second cycle of the load operation. When JOIN is active, however, the first set of input registers is loaded from the second set, and the second set from the external pins, so only one set of valid data is required.

CSEL also serves as the input enable signal for the Edge GIPP Hold signals EGH1 and EGH2. When CSEL is active, the outputs are enabled. When CSEL is inactive, the outputs revert to a high impedance state.

External Reset Pin RST

The RST pin allows a controlled asynchronous reset of the internal control and external status signals of the GIPP. The pin is active low. When RST is asserted, the entire DAV control shift register is reset to indicate invalid data. The internal counter and RX register are reset, and the control state machine put into the WAIT_DATA state, with IRF, ENIR and ENCNT all inactive. No reset is performed on the registers in the calculation stages.

Disable Counter Load Pin DISCNT

When DISCNT is active, ENCNT is inhibited, thus inhibiting the transferring of data from the input registers to the interpolation circuitry. The pin is active high.

DISCNT has no effect on the operations of the chip when HLD is active.

External Clock CP

The CP pin is the single external clock applied to the chip. CP is an active high, 25 MHz nominal frequency, input clock with a 50 % duty cycle.

Outputs

The outputs of the GIPP are compatible with CMOS level signals and are capable of supporting a maximum

$Y_a$ Output Bus YA(15:0)

The $Y_a$ output bus is the unsigned interpolated output value for axis A rounded to the nearest whole number. This bus is three-state. The interpolated values for a line appear sequentially on the pins beginning 20 clock cycles after the line endpoints are loaded into the interpolation circuitry.

$Y_b$ Output Bus YB(7:0)

The $Y_b$ output bus is the unsigned interpolated output value for axis B rounded to the nearest whole number. If the YMD pin is asserted, this bus outputs the most significant bits of the fractional portion of the output value for axis A in two's complement format. This bus is three-state. The interpolated values for a line appear sequentially on the pins beginning 20 clock cycles after the line endpoints are loaded into the interpolation circuitry.

When packaged in the 100 pin package, the most significant bit of this bus is not bonded out.

X Output Bus X(11:0)

The X output bus is the unsigned integer output coordinate corresponding to the A and B axis interpolated output values. This bus is three-state. The coordinate values for a line appear sequentially on the pins beginning 20 clock cycles after the line endpoints are loaded into the interpolation circuitry. If XMD is asserted, however, the two least significant bits of the word appear on the outputs one clock cycle before the rest of the word.

Divide by Zero Flag DVO

This flag indicates a divide by zero condition in the interpolation. The pin is active high. When DVO is true, the line endpoints have the same X coordinate, resulting in a division by zero. The values output on the axis buses in this case will be $y_{a1}$ and $y_{b1}$ The value output on the coordinate bus will be $x_1$. DVO remains active as long as the data which resulted in a divide by zero appears on the output.

When packaged in the 100 pin package, this pin is not bonded out.

Edge GIPP Hold Pins EGH1 and EGH2

These hold output pins indicate that the source of data for the GIPP should not be generating new data. Both signals are active high and three-state. CSEL is the output enable for these signals.

If CSEL is inactive, both outputs are placed in a high impedance state. If CSEL and both input data valid signals IDV1 and IDV2 are active, but the input registers are full, both EGH1 and EGH2 will be asserted after a one clock cycle delay. If CSEL is active, but both IDV! and IDV2 are inactive, both outputs will become inactive after a one clock cycle delay. If CSEL is active and the input data valid signals are different, one of the outputs will become active and the other inactive, again after a one clock cycle delay. If IDV1 is inactive, EGH2 will be asserted. If IDV2 is inactive, EGH1 will be asserted.

Data Valid Flag DAV

The data valid flag indicates that the GIPP outputs represent useful data. This pin is active low. When DAV is true, the current data is valid. When DAV is false, the data on the output buses is a repetition of the immediately previous value. When XMD is active, the signal appears on the outputs one clock cycle before the data whose validity it indicates. DAV is always active for at least the first cycle of every line input to the chip.

Internal Timing

One embodiment of the GIPP has been designed to run with a maximum external clock speed of 25 MHz.

Exception Handling

The only exceptions which occur in the GIPP chip are division by zero and invalid data. Status flags are available to indicate both of these conditions.

Division by Zero

A division by zero occurs when the input data points $P_1$ and $P_2$ both have the same x coordinate. In such a case, the DVO flag will be true when the resulting data is output from the chip. The output data for division by zero has been arbitrarily chosen to be the point $P_1$. The internal pipeline stages are set up to transfer the proper data to the output pins when this condition occurs. The flag is passed through the calculation stages together with the offending data, and is output at the same time as the data.

Invalid Data

Invalid output data is defined to be data which is an immediate repetition of output data from the previous clock cycle, whether valid or invalid. This condition occurs when the internal counter reaches its final value before the input registers have been refilled, causing the counter to halt at its last value. On the first clock cycle after the counter reaches that final value, the DAV flag is set false. It propagates through the calculation pipeline in conjunction with the interpolation data, and is output coincidentally with it. The DAV flag always indicates valid data for the first point of every line loaded into the chip.

Definitions of Significant Terms

The following are definitions of significant terms used throughout the drawings which definitions are useful to the understanding of the invention.

CX—After any stage, this is the remainder of the division $(x-x_1)/(x_2-x_1)$.

CXCNT—This is the counter which generates the CX values inserted into the calculation stages.

CYA—After any stage, this is the partial product of the sixteen bit word.

CYB—After any stage, this is the partial product of the eight bit word.

!DISCNT -This is the complement of the DISCNT control input to the chip. When DISCNT is active, data is not allowed to move from the input registers to the interpolation circuitry.

!EQNXT—This is the complement of the EQNXT signal, which indicates that the counters will complete their counting on the following clock cycle.

!JOIN—This is the complement of the JOIN control input to the chip. When JOIN is active, new lines input to the chip are appended to the end of the previous line.

MSAO—In any stage, this is the quotient bit pipelined to be used with the upper half of the sixteen bit multiplication.

MSBO—In any stage, this is the quotient bit pipelined to be used with the upper half of the eight bit multiplication.

RX—This is equal to the quantity $(x_2-x_1)$ in all stages.

RYSGNA—This is the sign of the quantity $(y_{a2}-y_{a1})$.

RYSGNB—This is the sign of the quantity $(y_{b2}-y_{b1})$.

SVRX—This register is used to save the RX value so it can be used at every point on a line.

SVX2—This register is used to save the $x_2$ value to be compared with the x counter to indicate end of count.

XBOUT—This is the eight bit output from the chip.

XC—This is the sign of the quantity $(x_2-x_1)$. It is generated in the prologue and passed through each stage unchanged. In the figures, it is shown as XCI as the input to a stage and as XCO at the output of a stage.

YAOUT—This is the sixteen bit output from the chip.

System Applications

The invention was designed primarily to perform line interpolation functions in support of shaded polygon rendering operations. However, there are other uses for the invention which will become apparent to those skilled in the art through this detailed description, the drawings and claims herein.

Polygon Draw and Fill

Figure 10:
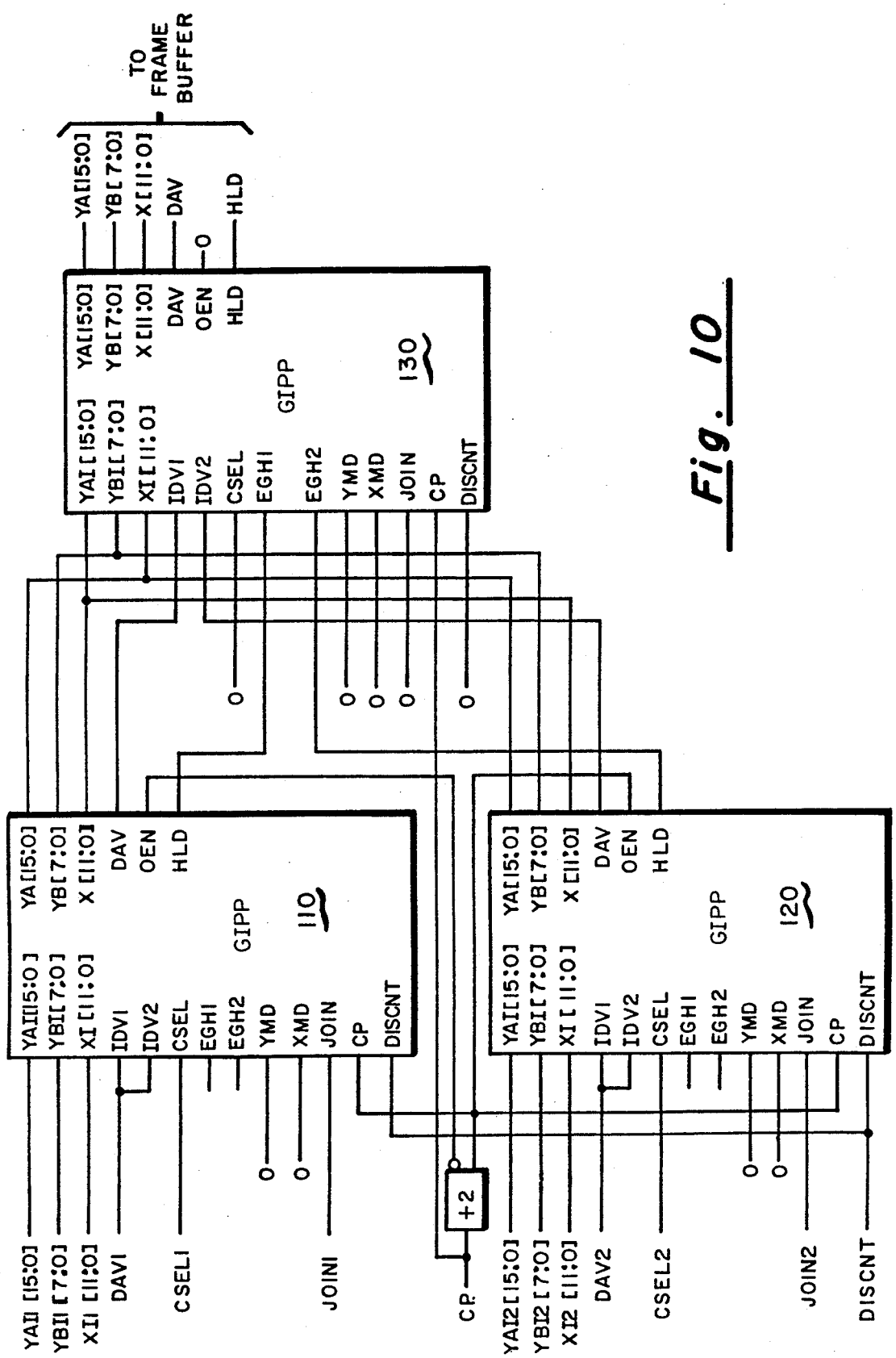
FIG. 10 schematically shows a block diagram of an application of three GIPP chips for a polygon draw and fill subsystem.

In one example application of the invention shown in FIG. 10, three GIPP chips, 110, 120 and 130, may be used to draw and fill polygons of any arbitrary size and shape. Two of the GIPP chips are used to draw the polygon edges and the third to fill the polygon from edge to edge. Since there are only two dependent variables available in each GIPP, only gray-scale polygons can be drawn using this configuration.

The chip select signal on the fill GIPP 130 should be tied active, and its hold outputs tied directly to the HLD pins on the two edge GIPPs 110 and 120. The XMD pin on the two edge GIPPs should be tied active to get the two least significant bits of X and the data valid flags from the edge GIPPs one clock cycle early. Those signals should be registered and the outputs fed directly to the fill GIPPs with the data valid flags inverted.

In order to load data into the fill GIPP properly, the edge GIPPs should be run at a clock rate equal to one-half of the fill GIPP clock rate. The output enables of the two edge GIPPs should be tied to the half speed clock and its complement so that the first data is placed on the inter-GIPP bus on the first half of the half speed clock cycle, and the second data on the second half of the cycle. Further gating is also required on the fill GIPP IDV signals; they should be active only on the first half of the half speed clock cycle, and inactive on the second half, in order to avoid loading unassociated points into the fill GIPP.

Extension of this architecture to allow full 24-bit color and depth cueing is straightforward. The simple architecture of FIG. 10 may be layered with each layer of GIPPs performing interpolations on two of the dependent variables. All the GIPPs in each stack receive the same independent variable.

Such stacking will require an inter-GIPP controller (not shown). The inter-GIPP controller is not affected by the extension to the large system. Since each GIPP in a stack receives the same independent variable and the same control signals, only one copy of the controller is required regardless of the number of GIPPs in a stack.

In order to further expand the capabilities of the draw and fill system, more than one stack may be used to fill the polygon between the edge values. The least significant bits of the X outputs of the edge drawing GIPPs can be decoded to generate the chip select signals for up to four fill GIPPs. The hold outputs of the fill GIPPs should be tied together and connected to the HLD pins on the edge GIPPs, as in the other systems. Again, only one inter-GIPP controller is needed regardless of the depth of the GIPP stacks.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Interpolation processor circuit apparatus embedded in a semiconductor chip for use in a video display system wherein the interpolation processor circuit apparatus comprises:
   (a) state machine means for controlling the operation of the interpolation processor apparatus wherein the state machine means includes a Join Endpoints input (JOIN), an Enable Input Registers output (ENIR), a Chip Select input (CSEL), first and second Input Data Valid inputs (IDV1 and IDV2), and an Enable Counter Load output (ENCNT);
   (b) a prologue stage including
      (i) a first input register means for receiving a first X coordinate,
      (ii) a second input register means for receiving a second X coordinate,
      (iii) a third input register means for receiving a first Y coordinate,
      (iv) a fourth input register means for receiving a second Y coordinate,
      (v) wherein the first, second, third and fourth register means are structured and arranged to be controlled by the state machine means so as to be loaded as enabled by the activation of the CSEL, IDV1 and IDV2 inputs of the state machine,
      (vi) a first adder means coupled to the first and second input registers for summing the contents of the first and second input registers and providing an RX result at a first adder output,
      (vii) a first output register for receiving the RX result from the first adder output,
      (viii) a second adder means coupled to the third and fourth registers for taking the deference between the first Y coordinate and the second Y coordinate and providing an RY result at a second adder output,
      (ix) a second output register coupled to receive the RY result from the second adder output,
      (x) a first counter means coupled to the first input register means for generating a quantity CX at a first counter output where CX is initially equivalent to the absolute value of $(x-x_1)$ where x is an independent variable and $x_1$ is the first X coordinate, and
      (xi) a second counter means coupled to the third input register means for generating a quantity CY at a second counter output where CY is initially equivalent to the value of the first Y coordinate;

(c) a plurality of identical calculation stages wherein each calculation stage includes:

(i) means for adding RX and CX to generate a new value of CX at an output using the complement of the sign of RX as a carry input wherein a sign LS is generated from the addition of RX and CX, (ii) means coupled to the output of the means for adding CX and RX, for determining whether to pass the new value of CX or the previous value of CX to the next calculation stage based on the sign LS wherein the first of said calculation stages has its means for adding RX and CX coupled to the first output register and the first counter output to receive values for RX and CX, and wherein the first and subsequent calculation stages each have RX and CX output registers coupled to pass values for RX and CX to the means for adding RX and CX in the next calculation stage;

(iii) means for adding RY and CY to generate a new value of CY at an output, and (iv) means coupled to the output of the means for adding RY and CY for determining whether to pass the new value of CY to the next calculation stage or the previous value of CY based on the sign LS wherein the first of said calculation stages has its means for adding RY and CY coupled to the second output register and the second counter output to receive value for RY and CY, and wherein the first and subsequent calculation stages each have RY and CY output registers coupled to pass values for RY and CY to the means for adding RY and CY in the next calculation stage.

2. The apparatus of claim 1 wherein, in a calculation stage, the previous CX and CY values are passed to the next calculation stage after being multiplied by 2 if the sign LS is negative.

3. The apparatus of claim 1 wherein the value of CY comprises a digital word including a fractional portion having a most significant bit and an integer portion having a least significant bit and wherein the apparatus further comprises a prologue section following and connected to the plurality of calculation stages wherein the prologue section includes a means for rounding further including means for adding the most significant bit of the fractional portion of the CY word to the least significant bit of the integer portion.

4. The apparatus of claim 3 wherein the first and second Y coordinates comprise eight bit digital words.

5. The apparatus of claim 3 wherein the first and second Y coordinates comprise 16 bit digital words.

6. The apparatus of claim 1 wherein the independent variable x is generated by an X counter coupled to the JOIN signal from the state machine which is loaded with the value of the first X coordinate from the first input register if the JOIN signal is inactive.

* * * * *

UNITED STATES PATENT AND TRADEMARK OFFICE
CERTIFICATE OF CORRECTION

PATENT NO. : 5,020,014

DATED : May 28, 1991

INVENTOR(S) : MICHAEL S. MILLER and HENDRIK A.E. SPAANENBURG

It is certified that error appears in the above-identified patent and that said Letters Patent is hereby corrected as shown below:

Column 16, line 55, cancel "deference" and substitute
 --difference--

Column 18, line 1, cancel "value" and substitute
 --values--

Signed and Sealed this

Twenty-fourth Day of November, 1992

*Attest:*

DOUGLAS B. COMER

*Attesting Officer*     *Acting Commissioner of Patents and Trademarks*